United States Patent
Englekirk (10) Patent No.: US 9,507,394 B2
(45) Date of Patent: Nov. 29, 2016

(54) INTEGRATED CIRCUIT WITH INTERNAL SUPPLY OVERRIDE

(71) Applicant: PEREGRINE SEMICONDUCTOR CORPORATION, San Diego, CA (US)

(72) Inventor: Robert Mark Englekirk, Pacific Palisades, CA (US)

(73) Assignee: Peregrine Semiconductor Corporation, San Diego, CA (US)

(*) Notice: Subject to any disclaimer, the term of this patent is extended or adjusted under 35 U.S.C. 154(b) by 841 days.

(21) Appl. No.: 13/853,936

(22) Filed: Mar. 29, 2013

(65) Prior Publication Data

US 2014/0292086 A1    Oct. 2, 2014

(51) Int. Cl.
*H02J 9/06*    (2006.01)
*G06F 1/26*    (2006.01)

(52) U.S. Cl.
CPC .............. *G06F 1/26* (2013.01); *Y10T 307/615* (2015.04)

(58) Field of Classification Search
CPC .......................... G06F 1/26; Y10T 307/615
USPC ............................................. 307/64, 18–29
See application file for complete search history.

(56) References Cited

U.S. PATENT DOCUMENTS

| 5,961,632 A * | 10/1999 | Shiell ................... G06F 9/30185 712/11 |
| 6,404,076 B1 * | 6/2002 | Matsuda ................. H02M 1/10 307/80 |
| 6,646,424 B2 * | 11/2003 | Zinn .................... H02M 3/1584 307/24 |
| 7,012,417 B2 * | 3/2006 | McClure ................. G05F 3/242 323/284 |
| 7,605,579 B2 * | 10/2009 | Betser ................... H02M 3/073 324/76.11 |
| 7,960,864 B2 * | 6/2011 | Riedel ........................ H02J 1/10 307/80 |
| 8,981,593 B1 * | 3/2015 | Kimpel ..................... H02J 1/10 307/29 |
| 2007/0040577 A1 * | 2/2007 | Lewis ............... H03K 19/17784 326/41 |
| 2007/0159557 A1 * | 7/2007 | Nakakita ................. H04N 5/148 348/707 |
| 2007/0200218 A1 * | 8/2007 | Mukaibara ........... H05K 1/0233 257/691 |
| 2007/0228830 A1 * | 10/2007 | Bernstein .............. G06F 1/3203 307/29 |

* cited by examiner

*Primary Examiner* — Jared Fureman
*Assistant Examiner* — Michael Warmflash
(74) *Attorney, Agent, or Firm* — Jaquez Land Greenhaus LLP; Martin J. Jaquez, Esq.; Alessandro Steinf, Esq.

(57) ABSTRACT

A monolithically integrated circuit with one or more supply overrides without need of an override control pin to the IC is presented. The internal circuitry to control such an override is presented and various override conditions are also presented.

24 Claims, 10 Drawing Sheets

INTEGRATED CIRCUIT WITH INTERNAL SUPPLY OVERRIDE

BACKGROUND

1. Field

The present teachings relate to power supplies in integrated devices. More particularly, the present teachings relate to a dual supply override, such as a dual supply override in integrated devices without requirement for extra enable/disable pins.

2. Description of Related Art

An integrated circuit (IC) typically requires multiple power supplies to drive its internal functional circuitry. In some cases the entirety of these supplies can be generated externally from the IC and be fed through dedicated pins to the IC when the IC gets integrated into the final product. In other cases, the IC gets integrated into products which are powered by a single source (e.g. battery in a cellular phone) and thus the IC needs to generate its own internal power supplies using the available single supply. These supplies typically include one positive supply (Vdd) and one negative supply (Vss) with reference to some fixed reference potential (Vref, e.g. ground). Chip manufacturers need to cater to both of these cases and oftentimes are required to fabricate different versions of the same IC (e.g. with same functional circuitry), but with different input power pins and different internal power supply generation circuitry.

As used in the present disclosure, the term "IC" can refer to an integrated circuit or monolithic integrated circuit composed of a set of electronic circuits on one small plate ("chip") of semiconductor material such as silicon. An IC can also be referred to as a "chip" or a "microchip". The set of electronic circuits within an IC are typically made of a very large number of transistors and other electronic components, which may need supply power (e.g. positive supply and negative supply) to operate. Based on the number of electronic components used within the IC and the size of the plate, thus the density of electronic components within the IC, ICs can be further categorized in, for example, small-scale integration (SSI), medium-scale integration (MSI), large-scale integration (LSI), and very-large-scale integration (VLSI). Newer categories also include wafer-scale integration (WSI), system-on-a-chip (SoC) and three-dimensional integrated circuits (3D-IC). Microprocessors or intelligent ICs, also known as "cores", and digital memory chips are some examples of ICs.

SUMMARY

According to a first aspect of the present disclosure, an integrated circuit (IC) is presented, the IC comprising: a functional circuit comprising a plurality of active and/or passive components configured to implement a function of the IC, the functional circuit operating on a plurality of power supplies, the plurality of power supplies being of positive and/or negative polarities; a power supply generation circuit configured to generate a first set of power supplies suitable for the functional circuit; one or more inputs to the IC in correspondence of the plurality of power supplies and configured to receive a second set of power supplies; and a power supply control circuit operatively coupled to the power supply generation circuit and to the one or more inputs, wherein the power supply control circuit is configured to control feeding of the plurality of power supplies on which the functional circuit operates by routing to the functional circuit one or more power supplies of the second set of power supplies, thus bypassing the power supply generation circuit, and/or by providing to the functional circuit one or more power supplies of the first set of power supplies generated by the power supply generation circuit, said directly routing to the functional circuit and said providing to the functional circuit being based on characteristics of the second set of power supplies.

According to a second aspect of the present disclosure, an integrated circuit (IC) is presented, the IC comprising: a functional circuit comprising a plurality of active and/or passive components configured to implement a function of the IC, the functional circuit operating on a positive power supply and a negative power supply; a power supply generation circuit configured to generate a first positive power supply and a first negative power supply suitable for the functional circuit; two inputs to the IC in correspondence of a second positive power supply and a second negative power supply; a power supply control circuit operatively coupled to the power supply generation circuit and to the two inputs; wherein the power supply control circuit is configured to include within conduction paths of the positive power supply and the negative power supply of the functional circuit one of: a) the first positive power supply and the first negative power supply, and b) the second positive power supply and the second negative power supply, based on a voltage level at an input of the two inputs in correspondence of the second negative power supply.

According to a third aspect of the present disclosure, a method for overriding internal power supplies generated within an integrated circuit is presented, the method comprising: providing an integrated circuit (IC) comprising a functional circuit configured to operate based on a plurality of power supplies; providing a power supply generation circuit within the IC configured to generate a plurality of internal power supplies suitable for the functional circuit; providing a plurality of power inputs to the IC configured to receive a plurality of external power supplies; providing a plurality of selectable conduction paths for the plurality of power supplies, the plurality of selectable conduction paths either including the plurality of internal power supplies or the plurality of power inputs; detecting a voltage level at one of the plurality of power inputs; based on the detecting, selecting a conduction path from the plurality of conduction paths for the plurality of power supplies; and based on the selecting, either providing the plurality of internal power supplies or the plurality of external power supplies to the functional circuit.

DETAILED DESCRIPTION

Throughout this description, embodiments and variations are described for the purpose of illustrating uses and implementations of the inventive concept. The illustrative description should be understood as presenting examples of the inventive concept, rather than as limiting the scope of the concept as disclosed herein.

In order to operate its internal electronic circuitry, an IC requires a source of power. This source of power, also referred to as supply power, is usually provided via fixed voltage sources typically including a positive voltage source and a negative voltage source, both referenced with respect to a common potential, referred to as reference potential, e.g. ground. The positive voltage source, also referred to as positive voltage supply, is typically referred to as "Vdd", the negative supply is typically referred to as "Vss", and the reference potential is referred to as "Vref". Throughout this disclosure these nomenclatures will be used. It should be noted that in some cases the IC may operate on two supply sources of same polarities (e.g. both positive or both negative) in which case the supplies may be referenced using numeral subscripts (e.g. Vss1, Vss2). In other cases, the IC may require more than two supply sources with arbitrary combinations of positive and negative supplies. Although for the exemplary embodiments presented in this disclosure the typical case of a dual supply configuration with one positive and one negative supply is considered, the skilled person will be able to use the teachings of the present disclosure and apply them to other specific cases as required.

Figure 1:
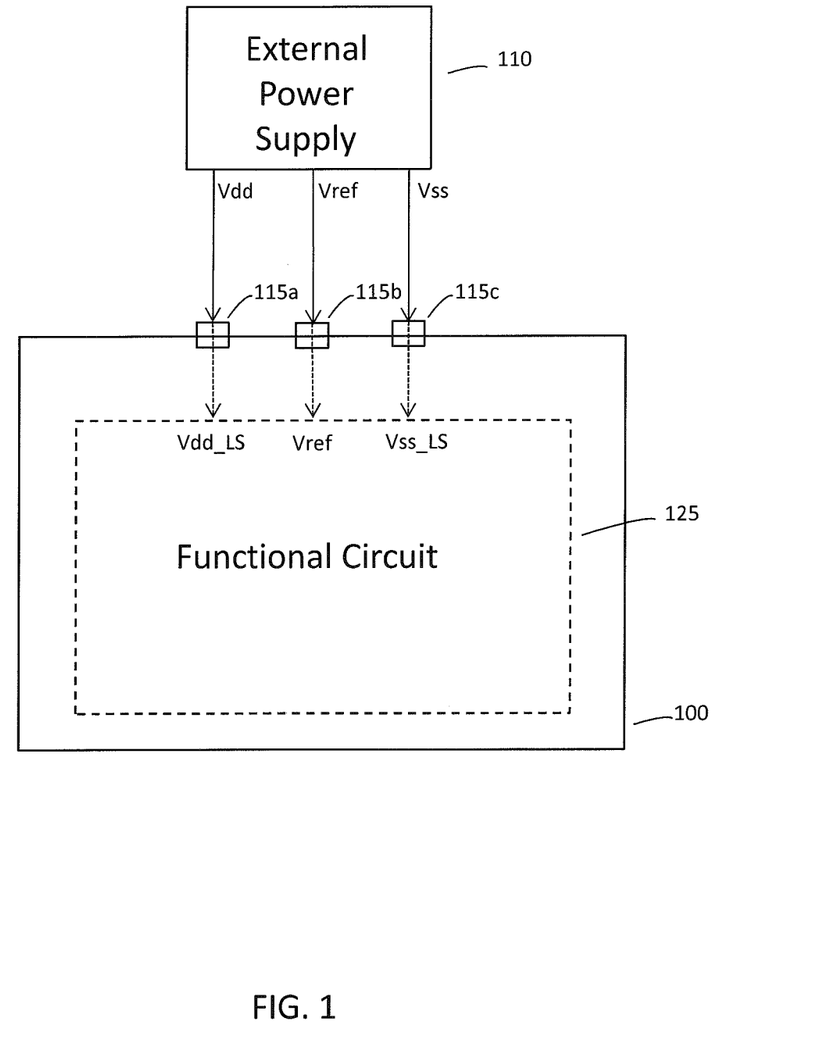
FIG. 1 shows an integrated circuit (IC) whose supplies are provided by an external power supply through dedicated input pins.

FIG. 1 shows an external power supply (110) providing positive supply Vdd, negative supply Vss and a reference potential Vref to an IC (100), through dedicated input pins (115a), (115c) and (115b) respectively. These supplies are in turn fed internally to the IC (100) to circuitry (125), which performs the main functional task of the IC. Additional input/output pins used by the IC to perform its functions are not depicted in FIG. 1 for the sake of clarity.

Figure 2:
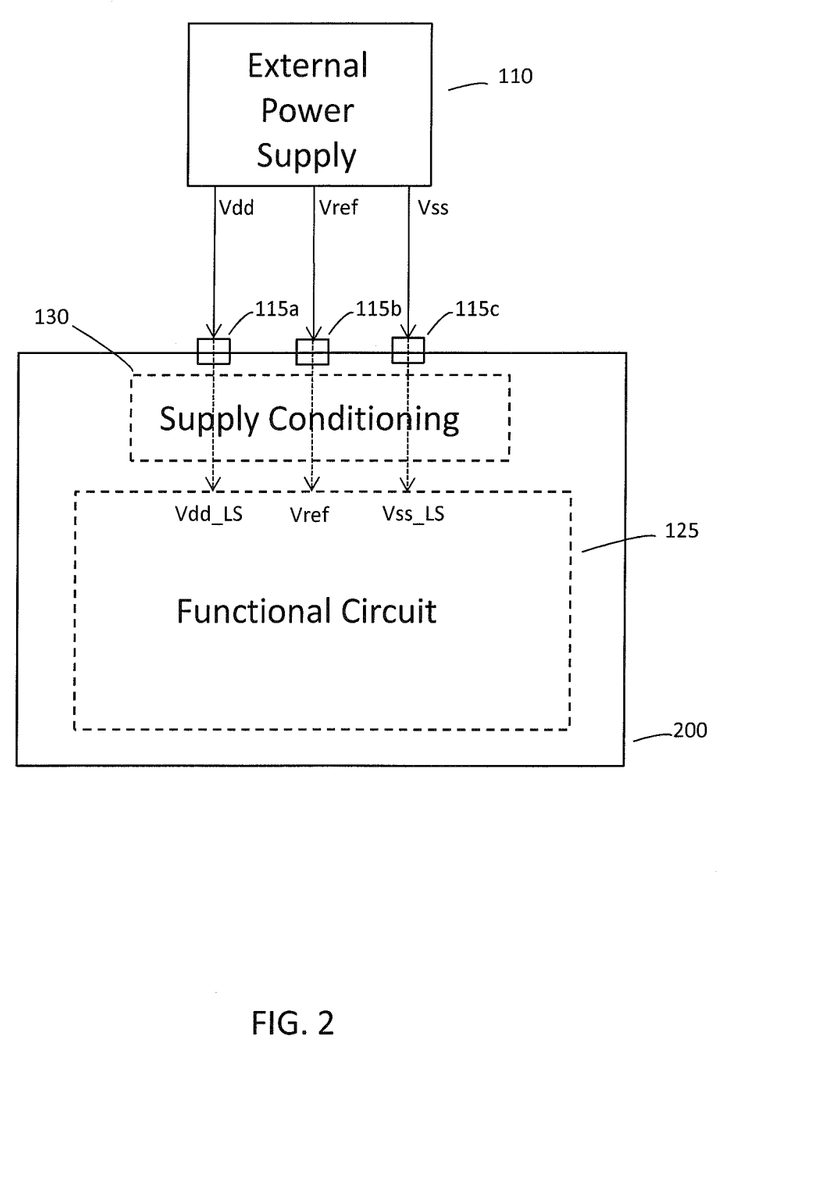
FIG. 2 shows the IC of FIG. 1, whose supplies are further conditioned internally.

In some cases and prior to being internally fed to the functional circuit (125), the provided supplies can be further conditioned, wherein for example levels associated to these supplies may be adjusted and/or regulated, or input voltages can be filtered as to further protect internal functions implemented within the circuit (125). FIG. 2 shows such an example, wherein a supply conditioning module (130) internal to the IC (200) is used for such tasks. In general, such a conditioning circuit does not have a negative impact, such as noise introduction, to the overall integrated product.

Oftentimes ICs gets integrated into products with differing power supply capabilities, which at times are not sufficient to the specific supplies required by the IC, as many ICs require at least one positive and one negative supply. For example, in the case of a handheld product such as a cellular phone, only a single supply (e.g. a positive supply), is available to the IC. In this case, the IC must be able to internally generate the required negative supply from the provided positive battery supply. This task is typically performed by a charge pump circuit, which is a type of DC-DC converter operating in a switching mode and controlled by an oscillator (e.g. clock) running at a frequency of several tens of Kilohertz up to several Megahertz. Such a charge pump circuit can perform any operation, including multiplying, scaling and inverting of an input voltage with relatively high efficiency. Charge pump circuits are described, for example, in the book entitled "Charge Pump Circuit Design", authored by Feng Pan and Tapan Samaddar, and published by McGraw-Hill in 2006, which is incorporated herein by reference in its entirety. However, the skilled person will understand that other circuitry capable of performing the task of DC-DC converting can also be used.

Figure 3:
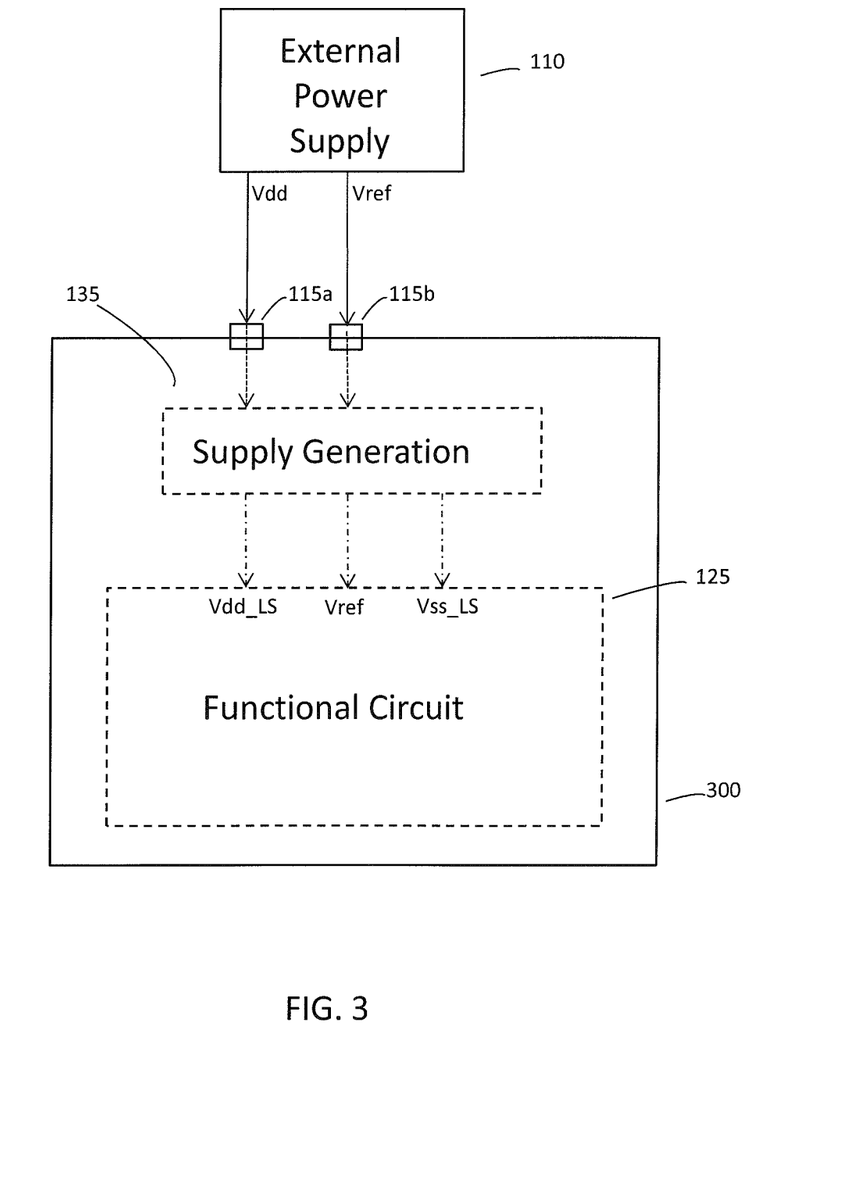
FIG. 3 shows an IC generating its internal supplies based on a single externally provided supply.

FIG. 3 depicts such cases, wherein a single positive supply voltage is provided by the external power supply (110) to the IC (300) via two dedicated input pins (115a) and (115b). Internally, the task of generating the required supplies to the functional circuit (125) is performed by a supply generation unit (135) which may include a charge pump circuit to convert the input Vdd to a positive Vdd_LS and a negative Vss_LS supply voltage for the circuit (125). It should be noted that in some cases only the Vss_LS is generated internally, and the input Vdd is fed (with or without some conditioning) directly to the internal functional circuit (125).

Due to the switching nature of the charge pump and other similar DC-DC converters used to invert a positive voltage, associated spurious components can couple into the internal IC circuitry as well as into other circuitry within the product in which the IC is integrated and thus cause undesired interferences. In systems/products where sensitive circuitry is used, such interferences (e.g. spurious noise) can be detrimental with respect to the intended performance of the circuitry. For this reason, manufacturers of sensitive electronic products, such as automated test equipment (ATE), prefer to provide all the supplies necessary to the IC and not have the IC internally use supply generation circuitry, which can affect end performance of their products (as depicted in FIGS. 1 and 2).

As such, an IC manufacturer will need to cater to two distinct types of customers/products: one which provides all the necessary supplies (e.g. FIG. 1), while the other provides a single (e.g. positive) supply (e.g. FIG. 3). Furthermore, IC manufacturers may need to provide a same IC, meaning an IC with the same functionality as implemented by its internal circuitry (e.g. circuit (125)) and input/output pins, to each of these customers. This translates, for example, to excess manufacturing, inventory and support cost, as two versions of a same IC need to be manufactured, stored and supported, which is a problem that IC manufacturers prefer to avoid.

Figure 4:
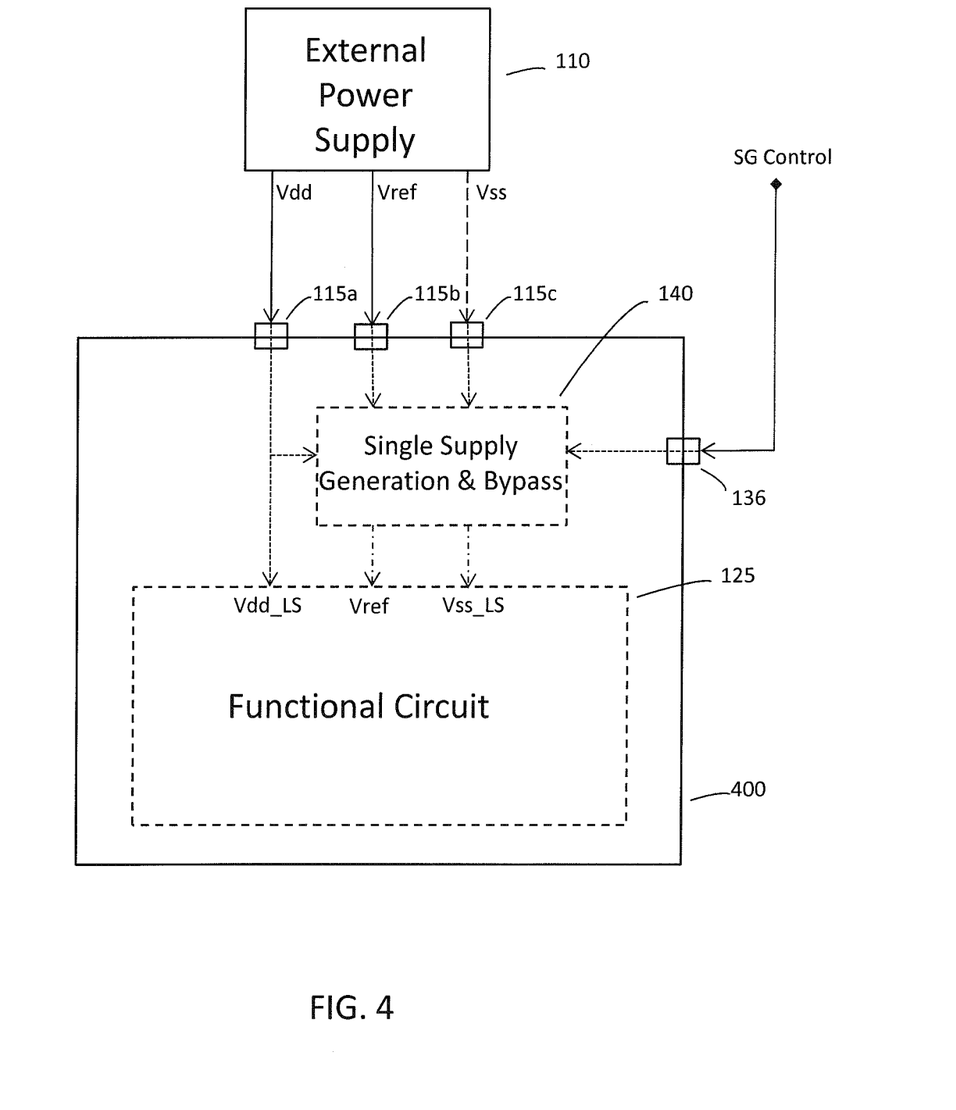
FIG. 4 shows an IC configurable via an external configuration control signal fed to a dedicated input pin to either operate based on external supplies or on one external positive supply and one internally generated negative supply.

In order to solve this problem, IC manufacturers may manufacture one IC with an internal supply generation circuitry, which may be activated/deactivated via an external configuration control signal fed to a dedicated input pin to the IC. Such configuration is depicted in FIG. 4, where a supply generation and bypass circuit (140) internal to the IC (400) is used to generate the internal negative supply Vss_LS to the functional circuit (125). Under control of a configuration control signal "SG Control" provided at input pin (136) of the IC (400), the supply generation and bypass circuit (140) either activates its internal DC-DC converter (e.g. charge pump and associated auxiliary components) to generate Vss_LS from the provided Vdd at the input pin (115a) of the IC (400), or deactivates such internal DC-DC converter and operates in a bypass mode wherein the input Vss is directly routed to the functional circuit (125), thus Vss_LS=Vss. Such configuration allows for a chip integrator to control the IC's internal supply method via the provided configuration control signal SG Control and effectively override an input supply with an internally generated supply when needed.

However, this method has the disadvantage of assigning one IC pin (136) to the configuration control signal and thus removing a valuable resource, as shrinking IC sizes and large device integration has a direct impact on the limited number of available pins in an IC.

Such problem is overcome by the present disclosure in accordance with one of its embodiments, where the supply generation and bypass circuit is provided with the capability to probe the presence of an input negative supply Vss, and accordingly internally generate a control signal with the same functionality as the configuration control signal SG Control of FIG. 4. This has the advantage of not requiring a dedicated configuration control pin and thus addresses the problem brought up with respect to FIG. 4.

Figure 5:
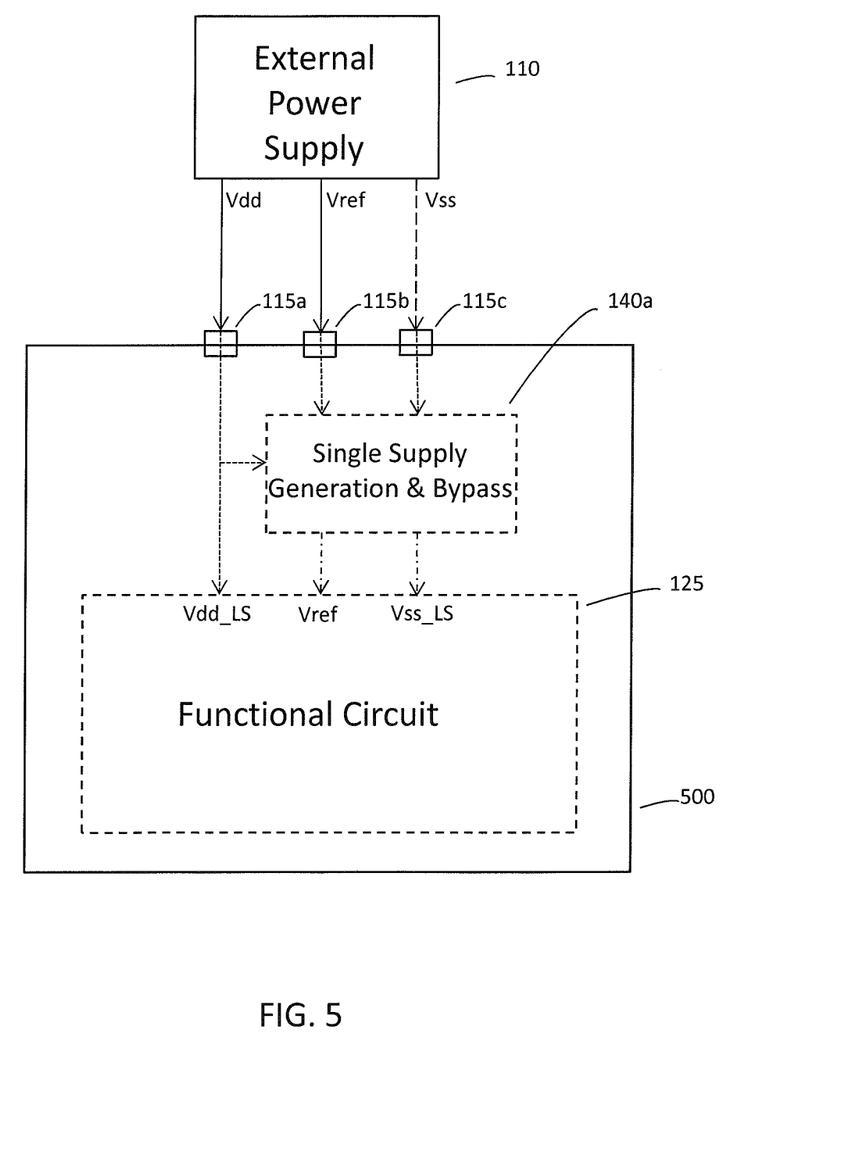
FIG. 5 shows an exemplary embodiment of the present disclosure where the supply configuration of the IC of FIG. 4 is performed without the need for a dedicated input pin.

FIG. 5 shows such an embodiment, wherein the single supply generation and bypass circuit (140a) generates the internal negative supply Vss_LS (e.g. using its internal DC-DC converter) by way of the input Vdd at pin (115a) when a negative Vss supply is not present at the input pin (115c), and passes through (bypass mode) the input negative supply Vss to the functional circuit (125) when Vss is present at input pin (115c) and at the same time deactivates any internal circuitry (e.g. charge pump) associated with the generation of the internal negative supply.

Figure 6:
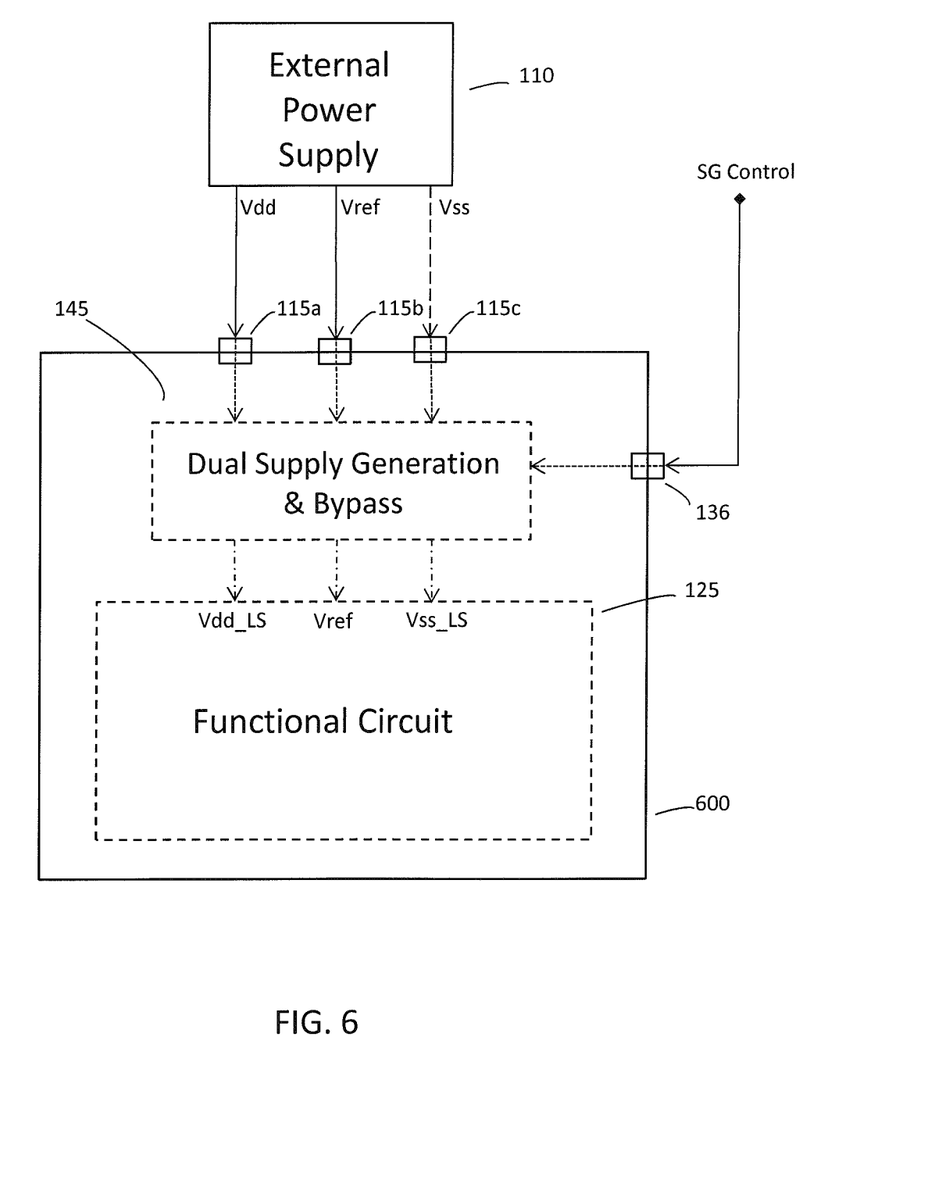
FIG. 6 shows an IC configurable via an external configuration control signal fed to a dedicated input pin to either operate based on external supplies or on internal supplies.

In some cases it may be desirable to internally generate both positive and negative supplies when only a single supply is provided to the IC, thus providing for better compatibility with voltage levels required by the internal circuitry (125). FIG. 6 depicts such a configuration, wherein under control of the SG Control signal at input pin (136), the dual supply generation and bypass circuit (145) either activates its internal DC-DC converters (e.g. charge pumps and associated auxiliary components) to generate positive Vdd_LS and negative Vss_LS voltage signals from the provided Vdd at the input pin (115a) of the IC (600), or it deactivates such internal DC-DC converters (e.g. one for each internal supply) and operates in a bypass mode wherein the input Vdd and input Vss are directly routed to the functional circuit (125), thus Vdd_LS=Vdd and Vss_LS=Vss. Such configuration allows for a chip integrator to control the IC's internal supply method via the provided configuration control signal SG Control. However, similarly to the case depicted by FIG. 4, this method also has the disadvantage of allocating a pin to the task on supply configuration control.

Figure 7:
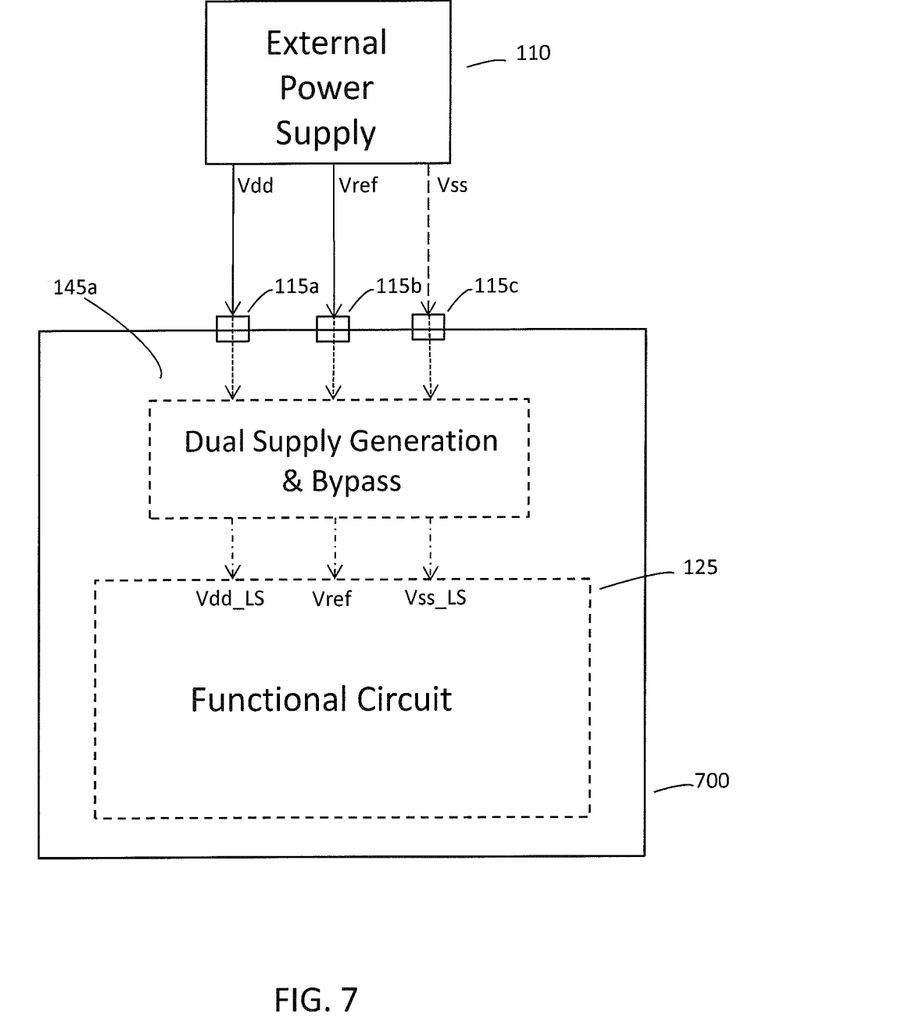
FIG. 7 shows an exemplary embodiment of the present disclosure where the supply configuration of the IC of FIG. 6 is performed without the need for a dedicated input pin.

The disadvantage of the configuration presented in FIG. 6 is alleviated by a further embodiment of the present disclosure, where both the positive and the negative supplies to the functional circuit (125) are internally generated based on the presence of an input negative supply at the input pin (115c) without the requirement of an external input configuration control signal (e.g. SG Control of FIG. 6). FIG. 7 depicts such an embodiment, wherein a dual supply generation and bypass circuit (145a) generates the internal positive supply Vdd_LS and the negative supply Vss_LS based on the input Vdd at pin (115a) when a negative Vss supply is not present at the input pin (115c), and passes through (bypass mode) the input positive and negative supplies Vdd and Vss to the functional circuit (125) when Vss is present at input pin (115c) and, at the same time, deactivates any internal circuitry (e.g. charge pumps) associated with the generation of the internal supplies.

Figure 8:
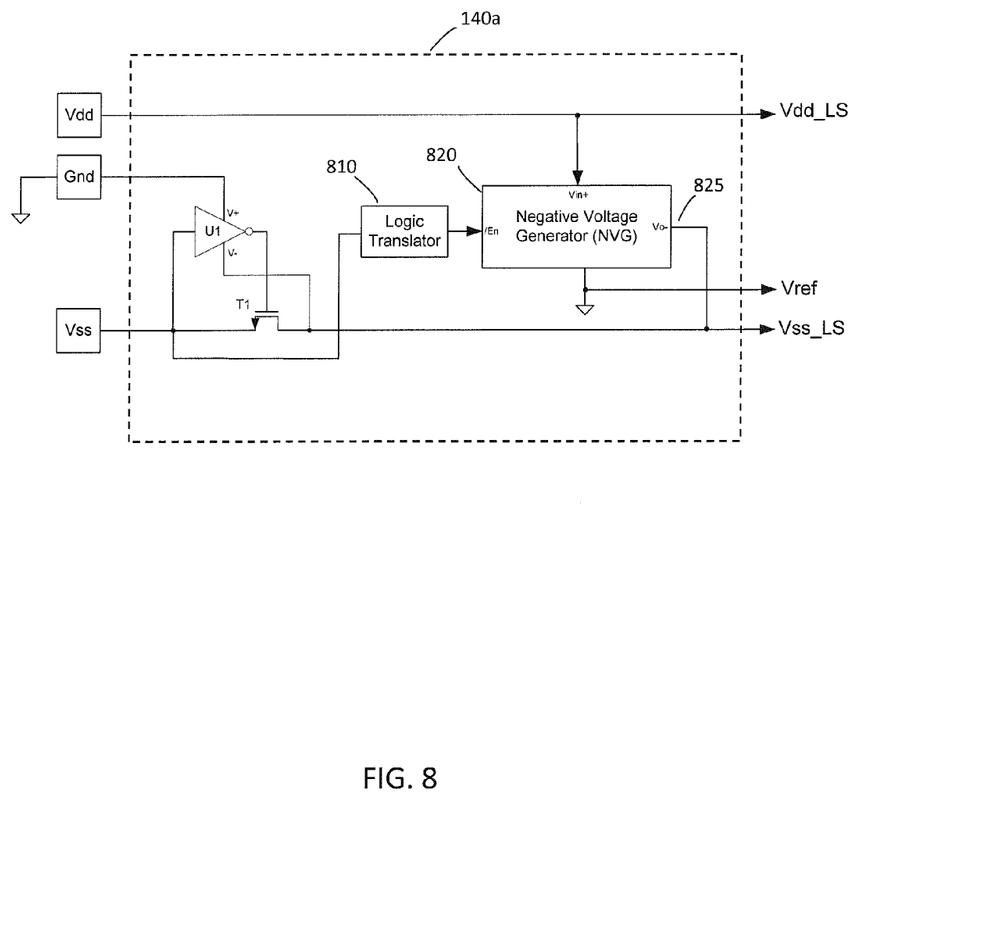
FIG. 8 shows an exemplary embodiment of the present disclosure of an internal negative supply generation and bypass circuit, for usage in the embodiment of FIG. 5.

FIG. 8 depicts a circuital arrangement according to one embodiment of the present disclosure. This circuital arrangement can be used as the single supply generation and bypass circuit (140a) presented in FIG. 5, with input supplies Vdd, Vss and Vref (e.g. Gnd) from the external power supply (e.g. (110) of FIG. 5), and outputs Vdd_LS, Vss_LS and Vref (e.g. to the functional circuit (125) of FIG. 5). The circuital arrangement presented in FIG. 8 includes a CMOS logic inverter (U1), an N-channel MOSFET (T1) used in a pass gate configuration, a logic translator (810) used to translate an input voltage level to another, and a negative voltage generator (NVG, (820)) (e.g. a DC-DC converter) which, when activated, is used to generate a negative supply voltage (e.g. Vss_LS) at its output (825) from a provided input positive supply voltage (e.g. Vdd) fed to its input (Vin+). The NVG is further configured to be activated/deactivated via an input control signal fed to its input (/En). In the embodiment of FIG. 8, the inverter (U1) is biased with ground as its high level and a negative voltage (e.g. negative voltage output by the NVG) as its low level, which means that a zero voltage value at the input/output of the inverter (U1) corresponds to a "high" state, while a negative voltage value at the input/output of the inverter (U1) corresponds to a "low" state.

As the NVG unit (820) is powered with the input Vdd (assumed available), it outputs a negative voltage, which is provided to the negative bias terminal (V−) of the inverter (U1). If Vss is not present and thus (approximately) equal to zero volts, as Vss is connected to the input of the inverter (U1), the output of the inverter (U1) goes in a low state (negative voltage) as a zero Volt input represents a high state. As the output of the inverter (U1) is connected to a gate terminal of the N-channel MOSFET transistor (T1), this yields to a zero Volt $V_{GS}$ voltage across the gate-source terminals of the transistor (T1), which thereby turns OFF the transistor (T1) and thus prevents any current flow into the direction of Vss (e.g. from output of NVG). The logic translator converts the Vss voltage at its input to a level appropriate to the input enable (e.g. /En input active low) signal of the NVG (820) to maintain the NVG (820) active and thus providing the negative Vss_LS supply to the output (e.g. to functional circuit (125) of FIG. 5). It should be noted as it is the case for most devices used in common logic, T1 has a sufficiently high enough threshold voltage Vt (e.g. +0.7V) such that zero Volt $V_{GS}$ turns it OFF. It should also be noted that Source/Drain are swappable pins on the transistor symbols used in various figures of this disclosure, and that the definition of a pin (drain vs. source) may change depending on the voltage conditions at the time. For NMOS, the drain is typically at the higher potential. It should also be noted that the NVG unit (820) of FIG. 8 will be activated as long as Vss input to the circuit (140a) is near Gnd level (e.g. between 0V and −0.7V). This behavior is implemented in the design logic of the logic translator unit (810), for example by requiring an input (e.g. Vss) to the logic translator (810) to provide a pull-down current to bring (810) input below Gnd level, and simply floating below Gnd level such input will not activate the logic translator (810) and thus will not deactivate the NVG (820).

On the other hand, assuming that the Vss input to the circuit (140a) of FIG. 8 is now present (and negative), which represents a low state at the input of inverter (U1), this prompts the output of the inverter to go high (zero volt), which yields to a positive $V_{GS}$ voltage across the transistor (T1) which effectively turns the transistor ON, and thus allows current to flow into the direction of Vss. At the same time, the logic translator (810) switches output state thus disabling the NVG (820). A disabled NVG (820) provides a high impedance at its output terminal (825) to effectively isolate itself from the remaining circuitry. At the same time, the internal NVG circuitry associated with the generation of the negative supply is deactivated. This effectively configures the input Vss to provide the negative Vss_LS supply to the output (e.g. to functional circuit (125) of FIG. 5). It should be noted that the high impedance at the output of the NVG (820) when latter is disabled is one possible output configuration of the device, and may not be true in other implementations, whereby when deactivated, an impedance (e.g. leakage) may appear as a load to the external Vss_LS supply. In such cases, a second "disconnect" switch may be required, as later described for the embodiment of FIG. 9.

Figure 9:
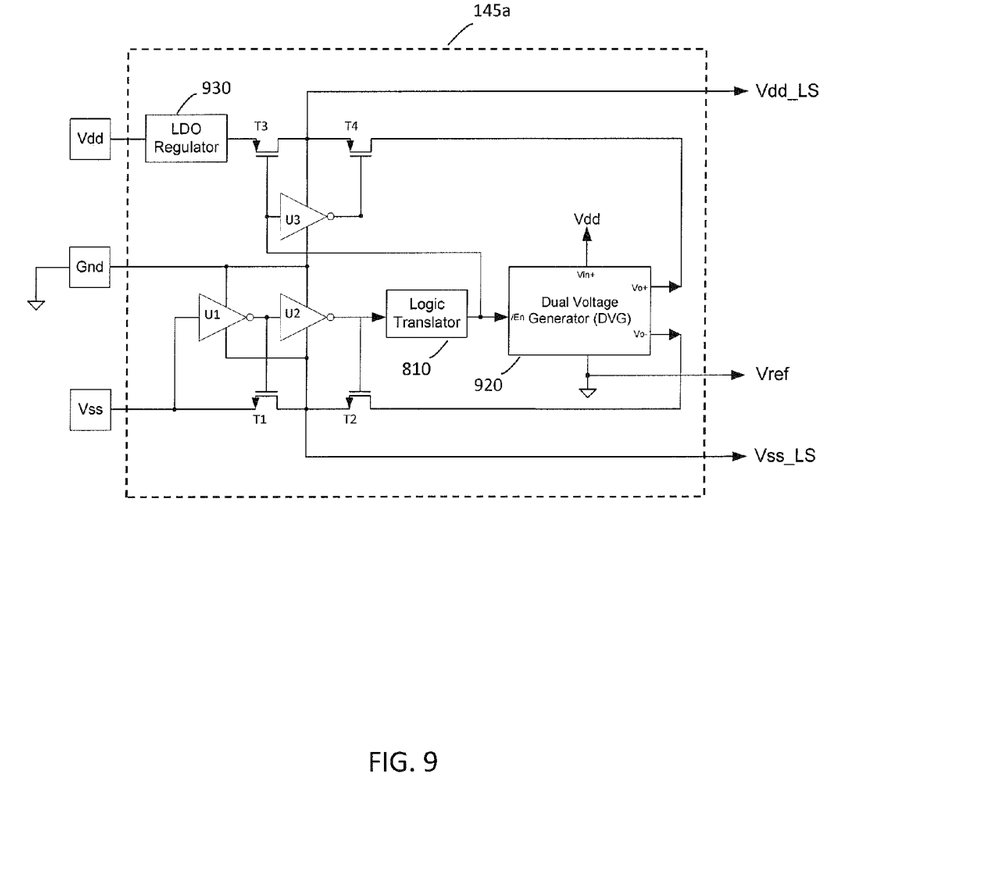
FIG. 9 shows an exemplary embodiment of the present disclosure of an internal dual supply generation and bypass circuit, for usage in the embodiment of FIG. 7.

FIG. 9 shows yet another circuital arrangement according to another embodiment of the present disclosure. This circuital arrangement can be used as the dual supply generation and bypass circuit (145a) presented in FIG. 7, with input supplies Vdd, Vss and Vref (e.g. Gnd) from the external power supply (e.g. (110) of FIG. 7), and outputs Vdd_LS, Vss_LS and Vref (e.g. to the functional circuit (125) of FIG. 7).

The circuital arrangement (145a) presented in FIG. 9 includes three CMOS logic inverters (U1-U3), two N-channel MOSFETs (T1, T2) and two P-channel MOSFETs (T3, T4), all four used in a pass gate configuration, a logic translator (810) used to translate an input voltage level to another, and a dual positive/negative voltage generator (DVG, (920)) (e.g. two DC-DC converters) which when activated is used to generate a positive (e.g. Vdd_LS) supply voltage and a negative supply voltage (e.g. Vss_LS) at its outputs (Vo+, Vo−) respectively from a provided input positive supply voltage (e.g. Vdd) fed to its input (Vin+). The DVG (920) is further configured to be activated/deactivated via an input control signal fed to its input (/En). Similarly to the case of the inverter (U1) of FIG. 8, the inverters (U1 and U2) of FIG. 9 are also biased with ground as the high level and negative voltage as the low level, whereas inverter (U3) is biased with a positive voltage (e.g. positive output (Vo+) of the DVG) as the high level and ground as the low level.

Both the circuit of FIG. 8 and the circuit of FIG. 9 use the same method to effectively isolate (no current flow) the Vss and the Vdd inputs from the conduction paths of Vdd_LS and Vss_LS outputs when the input supply Vss is not present. For example, when Vss is not present, a corresponding input voltage to the circuit (145a) is approximately zero volts (high state for inverter (U1)), so that the output of (U1) is low and (T1) is OFF. In turn, the output of inverter (U2) is high and the transistor (T2) is ON. The logic translator (810) converts its input high state to a positive logic high state (e.g. positive voltage) and feeds this translated high state to the input of the inverter (U3), which consequently outputs a low state. It follows that $V_{GS}$ of (T3) is zero and thus the P-channel MOSFET (T3) is OFF and the $V_{GS}$ of (T4) is negative and thus the P-channel MOSFET (T4) is ON. As a consequence, when the input Vss is not present (e.g. almost zero volts), the circuit (145a) of FIG. 9 effectively isolates Vdd and Vss inputs from the conduction paths of Vdd_LS and Vss_LS, while simultaneously including the positive (Vo+) and negative (Vo−) outputs of the DVG in the conduction paths of Vdd_LS and Vss_LS respectively. The DVG (920) effectively makes the outputs (Vo+) and (Vo−) as the effective supplies output by the circuit (145a) (e.g. to provide supplies to the functional circuit (125) of FIG. 7).

Conversely, when the input supply Vss is present, transistors (T1) and (T3) are ON and transistors (T2) and (T4) are OFF, effectively isolating the outputs (Vo+) and (Vo−) of the DVG (920) from the conduction paths of the supply voltages Vdd_LS and Vss_LS, while including the inputs Vdd and Vss supplies within such conduction paths. This effectively configures the input Vdd to provide the positive Vdd_LS supply to the output (e.g. to functional circuit (125) of FIG. 7), and the input Vss to provide the negative Vss_LS supply to the output (e.g. to functional circuit (125) of FIG. 7). At the same time, the input enabling signal (/En) to the DVG unit (920) switches state, thus deactivating the DVG unit (920) and corresponding internal circuitry used to generate the output voltages (e.g. charge pumps and related circuitry).

It should be noted that when activated, the DVG unit (920) generates fixed level outputs at voltage levels which can be different (e.g. higher or lower) from the input reference voltage fed to its input (Vin+). The chip manufacturer can select these levels as best suited for the internal functional circuits (125).

It should also be noted that the inclusion of a low drop-out (LDO) voltage regulator (930) at the Vdd input of the circuit (145a) of FIG. 9 provides, if desired, an added level of protection against out-of-specification input supply levels (too high) which may damage the IC's internal circuitry, as well as eliminating any low frequency fluctuations in the provided supply. The skilled person will realize that inclusion or not of such an LDO at either the Vdd or Vss inputs to the circuit (145a) of FIG. 9 is possible and should not be considered as a limitation of the embodiment of FIG. 9.

Furthermore, the skilled person will also be able to use the teachings from the various embodiments presented in this disclosure to generate and/or bypass more than two internal supply voltages and/or to base the activation/deactivation of the internal voltage generators based on other criteria, such as presence/absence of the positive Vdd input supply or based on a voltage level of an input supply (e.g. input generation active if input Vss voltage is less than a percentage of a nominal input Vss value).

Figure 10:
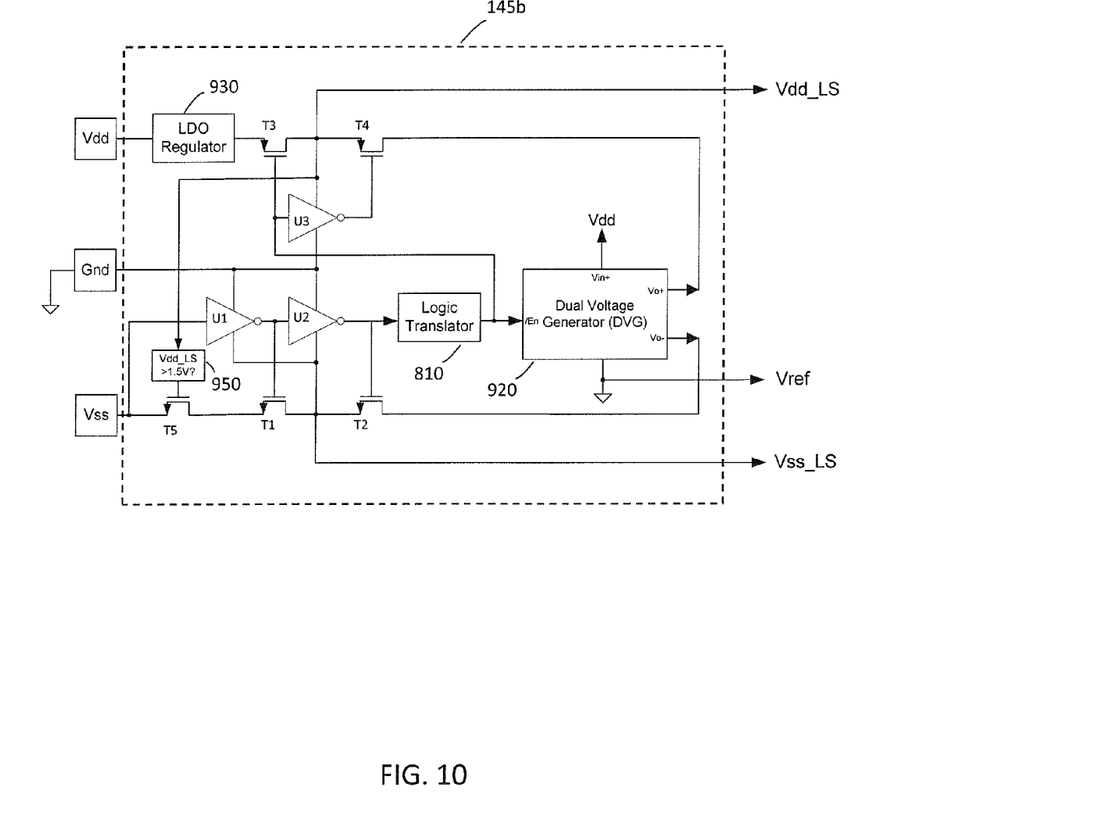
FIG. 10 shows an exemplary embodiment of the present disclosure of an internal dual supply generation and bypass circuit with power sequencing, for usage in the embodiment of FIG. 7.

FIG. 10 shows an embodiment according to the present disclosure where the externally provided negative supply Vss is not routed to the internal functional circuit (e.g. (125)) unless the externally provided positive supply Vdd reaches a certain minimum threshold (e.g. 1.5V) as dictated by the circuit (950). This added functionality with respect to the embodiment of FIG. 9, allows implementation of a power-sequencing scheme suited for the electrical circuitry/components within the functional circuit (125) when powered via external supplies, if needed. The circuit (145b) presented in FIG. 10 is similar in function to the one depicted by FIG. 9, with an added voltage comparator (950) and the N-channel MOSFET transistor (T5), the latter being inserted within the conduction path between the input Vss and the output Vss_LS. During the power-up sequence of the circuit (145b), the transistor (T5) remains OFF until Vdd_LS is above the reference voltage programmed into (950), and thus removes Vss from the conduction path of Vss_LS, effectively removing the supply to the functional circuit (e.g. (125)). Once the Vdd_LS to the functional circuit reaches the desired level (e.g. 1.5V), transistor (T5) turns ON, with consequent inclusion of Vss into the conduction path of Vss_LS, thus effectively making Vss the negative supply to the functional circuit. For the case where the internal power generation unit DVG (920) is used to provide power to the internal functional circuit (125), such power sequencing may be designed into the DVG (920) itself by the IC manufacturer. The skilled person will realize that such sequencing method can be applied to any of the power sources using various threshold levels as best suited to the internal circuit and not limited to the presented exemplary embodiment using a voltage level of the provided negative supply.

It should also be noted that the various transistors used in the presented circuits (140*a*, 145*a*, 145*b*) may be selected based on various IC operating parameters, such as current and voltage requirements as well as generated heat. Where applicable, fabrication processes using silicon on insulator (SOI), silicon on sapphire (SOS) or any other fabrication processes known to the skilled person may be used for fabricating ICs that include features per the present disclosure. Although in the exemplary embodiment disclosed in the present disclosure MOSFET transistors and CMOS inverters were used, these should not be considered as limiting the scope of the present teachings as similar devices in functionality may be substituted and as dictated by the specific applications and/or processes the skilled person desires. In particular, transistors may include any type of FET device (MOSFET, JFET, MESFET) and the CMOS inverter may include any type of logic gate or combination thereof.

The person skilled in the art will be able to extend the teachings of the present disclosure to any type of IC with single or multiple power sources, whether all of same polarities or combination of positive and negative polarities, in a manner similar to what has already been discussed in the present disclosure. Accordingly, what has been shown are devices and methods for single and dual supply override using no extra IC pins. While the devices and methods have been described by means of specific embodiments and applications thereof, it is understood that numerous modifications and variations could be made thereto by those skilled in the art without departing from the spirit and scope of the disclosure. It is therefore to be understood that within the scope of the claims, the disclosure may be practiced otherwise than as specifically described herein A number of embodiments of the present inventive concept have been described. Nevertheless, it will be understood that various modifications may be made without departing from the scope of the inventive teachings.

Accordingly, it is to be understood that the inventive concept is not to be limited by the specific illustrated embodiments, but only by the scope of the appended claims. The description may provide examples of similar features as are recited in the claims, but it should not be assumed that such similar features are identical to those in the claims unless such identity is essential to comprehend the scope of the claim. In some instances the intended distinction between claim features and description features is underscored by using slightly different terminology.

The invention claimed is:
1. An integrated circuit (IC) comprising:
  a functional circuit comprising a plurality of active and/or passive components configured to implement a function of the IC, the functional circuit operating on a plurality of power supplies, the plurality of power supplies being of positive and/or negative polarities;
  a power supply generation circuit configured to generate a first set of power supplies suitable for the functional circuit;
  one or more input pins to the IC in correspondence of the plurality of power supplies and configured to receive a second set of power supplies; and
  a power supply control circuit operatively coupled to the power supply generation circuit and to the one or more input pins,
  wherein the power supply control circuit is configured to control feeding of the plurality of power supplies on which the functional circuit operates according to two modes of operation based on characteristics of the second set of power supplies, wherein:
  in a first mode of operation, one or more power supplies of the second set of power supplies are routed to the functional circuit, thus bypassing the power supply generation circuit, and
  in a second mode of operation, one or more power supplies of the first set of power supplies generated by the power supply generation circuit are routed to the functional circuit.

2. The IC of claim 1, wherein the characteristics is a combination of one or more of: a) a voltage level of a positive supply of the second set of power supplies, b) a voltage level of a negative supply of the second set of power supplies, c) a positive voltage level at a pin of the one or more input pins, and d) a negative voltage level at a pin of the one or more input pins.

3. The IC of claim 2, wherein the plurality of power supplies on which the functional circuit operates are from a combination of power supplies from the first set of power supplies and power supplies from the second set of power supplies, the combination being based on the characteristics of the second set of power supplies.

4. The IC of claim 3, wherein the negative polarity power supplies from the plurality of power supplies on which the functional circuitry operates are from the first set of power supplies and the positive polarity power supplies from the plurality of power supplies on which the functional circuitry operates are from the second set of power supplies.

5. The IC of claim 4, wherein the second set of power supplies does not contain any negative polarity power supply.

6. The IC of claim 5, wherein the characteristics is based on the absence of a negative polarity power supply from the second set of power supplies.

7. The IC of claim 2, wherein the power supply generation circuit comprises a DC-DC converter circuit, the DC-DC converter circuit being configured to be activated and deactivated based on a first control signal, the first control signal switching according to the characteristics of the second set of power supplies.

8. The IC of claim 2, wherein the plurality of power supplies on which the functional circuit operates are all from the first set of power supplies or all from the second set of power supplies.

9. The IC of claim 8, wherein the power supply generation circuit comprises a DC-DC converter circuit, the DC-DC converter circuit being configured to be activated when the first set of power supplies are routed to the functional circuit, and deactivated when the second set of power supplies are routed to the functional circuit.

10. The IC of claim 9, wherein deactivation of the DC-DC converter circuit removes interferences associated with the generation of the first set of power supplies to the functional circuit and to a system within which the integrated circuit is used.

11. The IC of claim 2, wherein the power generation circuit comprises:
one or more DC-DC converter circuits using one or more charge pump devices configured to receive one positive supply power from the second set of power supplies and generate therefrom the first set of power supplies.

12. The IC of claim 11, wherein the power supply control circuit comprises:
an input power detection circuit configured to detect a voltage level at an input pin of the one or more input pins in correspondence of a power supply and generate an activation control signal as consequence of the detection, and
a control and bypass circuit configured to activate/deactivate the one or more DC-DC converter circuits based on the activation control signal, wherein when activated, an output of the one or more DC-DC converter circuits is routed to the functional circuit, and when deactivated, the one or more DC-DC converter circuits are bypassed and the second set of power supplies are routed to the functional circuit.

13. The IC of claim 12, wherein the control and bypass circuit is further configured to control a conduction path in correspondence of a power supply to the functional circuit, wherein the conduction path either includes an output of the one or more DC-DC converter circuits or an input pins of the one or more input pins to the IC.

14. The IC of claim 13, wherein the power supply control circuit comprises one or more of: a) one or more FET devices, b) one or more logic gates, c) one or more logic translators, and d) one or more voltage level detectors.

15. The IC of claim 1, wherein the combination of the power supply generation circuit and the power supply control circuit is further configured to adapt to a power up sequence required by the functional circuit, wherein a first power supply of the plurality of power supplies on which the functional circuit operates is not routed to the functional circuit until a routed second power supply of the plurality of power supplies on which the functional circuit operates has reached a minimum required voltage level.

16. An integrated circuit (IC) comprising:
a functional circuit comprising a plurality of active and/or passive components configured to implement a function of the IC, the functional circuit operating on a positive power supply and a negative power supply;
a power supply generation circuit configured to generate a first positive power supply and a first negative power supply suitable for the functional circuit;
two input pins to the IC in correspondence of a second positive power supply and a second negative power supply;
a power supply control circuit operatively coupled to the power supply generation circuit and to the two input pins;
wherein, based on a voltage level at an input pin of the two input pins in correspondence of the second negative power supply, the power supply control circuit is configured to include within conduction paths of the positive power supply and the negative power supply of the functional circuit one of: a) the first positive power supply and the first negative power supply, and b) the second positive power supply and the second negative power supply.

17. The IC of claim 16, wherein the power supply generation circuit is further configured to be activated/deactivated based on the voltage level at the input pin.

18. The IC of claim 17, wherein deactivation of the power supply generation circuit removes interferences associated with the generation of the first positive power supply and the first negative power supply to the functional circuit and to a system within which the IC is used.

19. The IC of claim 16, wherein the combination of the power supply generation and the power control circuit is further configured to adapt to a power up sequence required by the functional circuit, wherein a first/second negative power supply is not included within a conduction path of the negative power supply until the positive power supply to the functional circuit provided by including a first/second positive power supply to a corresponding conduction path has reached a minimum required voltage level.

20. The IC of claim 1 fabricated using one of: a) a silicon on insulator (SOI) process, and b) a silicon on sapphire (SOS) process.

21. The IC of claim 14 fabricated using one of: a) a silicon on insulator (SOI) process, and b) a silicon on sapphire (SOS) process.

22. The IC of claim 16 fabricated using one of: a) a silicon on insulator (SOI) process, and b) a silicon on sapphire (SOS) process.

23. A method for overriding internal power supplies generated within an integrated circuit, the method comprising:
providing an integrated circuit (IC) comprising a functional circuit configured to operate based on a plurality of power supplies;
providing a power supply generation circuit within the IC configured to generate a plurality of internal power supplies suitable for the functional circuit;
providing a plurality of power input pins to the IC configured to receive a plurality of external power supplies;
providing a plurality of selectable conduction paths for the plurality of power supplies, the plurality of selectable conduction paths either including the plurality of internal power supplies or the plurality of power input pins;
detecting a voltage level at one of the plurality of power input pins;
based on the detecting, selecting a conduction path from the plurality of conduction paths for the plurality of power supplies; and
based on the selecting, either providing the plurality of internal power supplies or the plurality of external power supplies to the functional circuit.

24. The method of claim 23, wherein the providing of a first power supply to the functional circuit comprises:
monitoring a voltage level of a second power supply provided to the functional circuit;
based on the monitoring, waiting until the voltage level reaches a minimum level;
based on the waiting, providing the first power supply to the functional circuit, by selecting a corresponding conduction path.

* * * * *